US009485175B2

(12) United States Patent
Abdul et al.

(10) Patent No.: US 9,485,175 B2
(45) Date of Patent: Nov. 1, 2016

(54) CONTINUITY CHECK PROTOCOL OPTIMIZATION SYSTEMS AND METHODS

(71) Applicants: Jaffar Hameed Abdul, San Jose, CA (US); Bindhia Komath, San Jose, CA (US); Sowmya Chandran, San Jose, CA (US)

(72) Inventors: Jaffar Hameed Abdul, San Jose, CA (US); Bindhia Komath, San Jose, CA (US); Sowmya Chandran, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 142 days.

(21) Appl. No.: 14/450,939

(22) Filed: Aug. 4, 2014

(65) Prior Publication Data
US 2016/0036694 A1    Feb. 4, 2016

(51) Int. Cl.
G06F 11/00 (2006.01)
H04L 12/723 (2013.01)
H04L 12/24 (2006.01)
H04L 12/703 (2013.01)
H04L 12/721 (2013.01)
H04L 12/26 (2006.01)
H04L 12/707 (2013.01)

(52) U.S. Cl.
CPC ......... *H04L 45/507* (2013.01); *H04L 41/0654* (2013.01); *H04L 43/0811* (2013.01); *H04L 43/10* (2013.01); *H04L 45/28* (2013.01); *H04L 45/68* (2013.01); *H04L 45/22* (2013.01)

(58) Field of Classification Search
CPC . H04L 43/10; H04L 45/507; H04L 43/0811; H04L 45/28; H04L 45/68; H04L 41/0654; H04L 45/22
USPC .......................... 370/223–225, 227–228, 244
See application file for complete search history.

(56) References Cited

U.S. PATENT DOCUMENTS

| 7,903,548 | B2 | 3/2011 | Rahman et al. |
| 8,543,718 | B2 | 9/2013 | Rahman et al. |
| 2008/0285466 | A1* | 11/2008 | Salam ................. H04L 41/0226 370/241.1 |
| 2011/0075574 | A1* | 3/2011 | Perelstain ............. H04L 12/413 370/248 |
| 2011/0134791 | A1 | 6/2011 | So |
| 2013/0114394 | A1 | 5/2013 | Hu et al. |
| 2013/0229922 | A1 | 9/2013 | Li et al. |

(Continued)

FOREIGN PATENT DOCUMENTS

EP    2302840 A1    3/2011

OTHER PUBLICATIONS

Anonymous: "Stack Manager and High Availability Configuration Guide, Cisco IOS XE Release 3SE (Catalyst 3850 Switches)", Oct. 7, 2013, pp. 1-100, XP055232166, 170 West Tasman Drive, San Jose, CA 95134-1706 USA Retrieved from the Internet: URL:http://www.cisco.com/c/en/us/td/docs/switches/lan/catalyst3850/software/release/3se/ha_stack_manager/configuration_guide/b_hastck_3se_3850_cg.pdf.

(Continued)

Primary Examiner — Mang Yeung
(74) Attorney, Agent, or Firm — Clements Bernard PLLC; Christopher L. Bernard; Lawrence A. Baratta, Jr.

(57) ABSTRACT

A Continuity Check (CC) protocol optimization method in a switch includes operating a plurality of CC sessions with a peer switch, wherein, for CC intervals, N sessions of the plurality CC sessions are set to a short interval and M sessions of the plurality of CC sessions are set to a long interval, wherein N and M are integers; switching a first session of the N sessions with a second session of the M sessions based on one of a fault and user provisioning; and exchanging the CC intervals between the first session and the second session subsequent to the switching.

18 Claims, 10 Drawing Sheets

(56) References Cited

U.S. PATENT DOCUMENTS

2014/0019614 A1 1/2014 Rahman et al.
2014/0293771 A1* 10/2014 Sawaguchi ......... H04L 43/0811
370/219

OTHER PUBLICATIONS

Jose Liste et al: "Packet Evolution in Transport Networks—MPLS Transport Profile (MPLS-TP)", Jul. 10, 2012, pp. 1-61, XP055232284, Retrieved from the Internet: URL:http://www.slideshare.net/getyourbuildon/packet-evolution-in-transport-networks-mpls-transport-profile-mplstp-webinar.

Anonymous: "High-availability cluster—Wikipedia, the free encyclopedia", Jul. 22, 2014, pp. 1-3, XP055232156, Retrieved from the Internet: http://en.wikipedia.org/wiki/High-availability_cluster.

Extended European Search Report in Application No. 15178722.3—1857, Dec. 7, 2015.

D. Katz et al, "Bidirectional Forwarding Detection (BFD)," Internet Engineering Task Force (IETF), Jun. 2010, pp. 1-49.

D. Katz et al., "Bidirectional Forwarding Detection (BFD) for IPv4 and IPv6 (Single Hop)," Internet Engineering Task Force (IETF), Jun. 2010, pp. 1-7.

R. Aggarwal et al., "Bidirectional Forwarding Detection (BFD) for MPLS Label Switched Paths (LSPs)," Internet Engineering Task Force (IETF), Jun. 2010, pp. 1-12.

T. Nadeau et al., "Bidirectional Forwarding Detection (BFD) for the Pseudowire Virtual Circuit Connectivity Verification (VCCV)," Jun. 2010, pp. 1-14.

"OAM functions and mechanisms for Ethernet based networks," Telecommunication Standardization Sector of ITU, Nov. 2013, pp. 1-99.

* cited by examiner

| VERS | DIAG | STA | P | F | C | A | D | M | DETECT MULT | LENGTH |
|------|------|-----|---|---|---|---|---|---|-------------|--------|
| MY DISCRIMINATOR ||||||||||||
| YOUR DISCRIMINATOR ||||||||||||
| DESIRED MIN TX INTERVAL ||||||||||||
| REQUIRED MIN RX INTERVAL ||||||||||||
| REQUIRED MIN ECHO RX INTERVAL ||||||||||||
| AUTH TYPE | AUTH LEN |||||||| AUTHENTICATION DATA |||

CONTINUITY CHECK PROTOCOL OPTIMIZATION SYSTEMS AND METHODS

FIELD OF THE DISCLOSURE

The present disclosure relates generally to networking systems and methods. More particularly, the present disclosure relates to Continuity Check (CC) protocol optimization of sessions in Multiprotocol Label Switching (MPLS) Label Switched Paths, Pseudowires, Carrier Ethernet and the like.

BACKGROUND OF THE DISCLOSURE

Bidirectional Forwarding Detection (BFD) is a network protocol used to detect faults between two forwarding engines connected by a link. BFD provides low-overhead detection of faults even on physical media that do not support failure detection of any kind, such as Ethernet, virtual circuits, tunnels, Pseudowires, and MPLS Label Switched Paths. BFD is defined in IETF RFC 5880, "Bidirectional Forwarding Detection", D. Katz, D. Ward (June 2010); IETF RFC 5881, "BFD for IPv4 and IPv6 (Single Hop)", D. Katz, D. Ward (June 2010); IETF RFC 5884, "Bidirectional Forwarding Detection (BFD) for MPLS Label Switched Paths (LSPs)," R. Aggarwal, et al. (June 2010); and IETF RFC 5885, "Bidirectional Forwarding Detection (BFD) for the Pseudowire Virtual Circuit Connectivity Verification (VCCV)," T. Nadeau et al. (June 2010), the contents of which are incorporated by reference. Similarly, Carrier Ethernet includes Continuity Check Messages (CCMs) which are "heart beat" messages for Connectivity Fault Management (CFM) to detect connectivity failures in a Maintenance Association (MA). CFM is IEEE 802.1ag, Virtual Bridged Local Area Networks, Amendment 5: Connectivity Fault Management (2007) and ITU-T G.8013/Y.1731 (11/13) "OAM functions and mechanisms for Ethernet based networks," the contents of which are incorporated by reference.

BFD, CCMs, etc. operate by sending periodic Continuity Check (CC) packets in associated sessions at a specific interval, and a failure to receive a set number of packets (e.g., three) leads to a determination that the session is down. Note, the transmission intervals may be at short intervals such as 10 ms or less to be able to detect data path failures within 50 ms. This short interval can be processor intensive on physical hardware. Larger Ethernet switches are specifically designed to handle numerous short interval CC sessions, e.g., over 10,000. However, it is difficult for smaller-scale Ethernet switches, such as Customer Premises Equipment (CPE) switches, to handle large number of short interval CC sessions. In fact, smaller-scale Ethernet switches are designed to handle several orders of magnitude less short interval sessions, e.g. 16 sessions vs. 16,000 sessions for a larger, Central-Office (CO) located Ethernet switch. Further, if there is protection, each connection requires two CC sessions, so these smaller-scale Ethernet switches may be able to handle only a small number of CC sessions (e.g., 8 sessions). One option to alleviate this limitation would be to add additional processing power in the smaller-scale Ethernet switches. However, this is not feasible due to cost concerns and the like.

BRIEF SUMMARY OF THE DISCLOSURE

In an exemplary embodiment, a Continuity Check (CC) protocol optimization method in a switch includes operating a plurality of CC sessions with a peer switch, wherein, for CC intervals, N sessions of the plurality CC sessions are set to a short interval and M sessions of the plurality of CC sessions are set to a long interval, wherein N and M are integers; switching a first session of the N sessions with a second session of the M sessions based on one of a fault and user provisioning; and exchanging the CC intervals between the first session and the second session subsequent to the switching. The short interval can be less than or equal to 10 ms providing 50 ms fault detection and the long interval is 100 ms or greater. The CC sessions can be Bidirectional Forwarding Detection (BFD) sessions. The CC sessions can be Bidirectional Forwarding Detection (BFD) sessions, and wherein the first session and the second session can be 1:1 protected Label Switched Paths (LSPs) with the first session and the second session being, prior to the switching, an active path and a backup path respectively. The CC sessions can be Bidirectional Forwarding Detection (BFD) sessions, wherein the N sessions and the M sessions are in a Label Switched Path (LSP) tunnel group with N<M. The CC sessions can be Bidirectional Forwarding Detection (BFD) sessions, and wherein the exchanging can be performed by changing interval times in BFD control packets. The exchanging can be performed in-service without affecting service on the first session and the second session. The CC sessions can be Connectivity Fault Management (CFM) sessions. The CC sessions can be Pseudowire Virtual Circuit Connectivity Verification (VCCV) sessions.

In another exemplary embodiment, a switch with Continuity Check (CC) protocol optimization includes one or more ports; and a controller communicatively coupled to the one or more ports; wherein the one or more ports and the controller are configured to operate a plurality of CC sessions with a peer switch, wherein, for CC intervals, N sessions of the plurality CC sessions are set to a short interval and M sessions of the plurality of CC sessions are set to a long interval, wherein N and M are integers, switch a first session of the N sessions with a second session of the M sessions based on one of a fault and user provisioning, and exchange the CC intervals between the first session and the second session subsequent to the switching. The short interval can be less than or equal to 10 ms providing 50 ms fault detection and the long interval is 100 ms or greater. The CC sessions can be Bidirectional Forwarding Detection (BFD) sessions, and wherein the first session and the second session can be 1:1 protected Label Switched Paths (LSPs) with the first session being an active path and the second session being a backup path prior to the switching. The CC sessions can be Bidirectional Forwarding Detection (BFD) sessions, wherein the N sessions and the M sessions can be in a Label Switched Path (LSP) tunnel group with N<M. The CC sessions can be Bidirectional Forwarding Detection (BFD) sessions, and wherein the exchanging can be performed by the switch through changing interval times in BFD control packets. The exchanging is performed in-service without affecting service on the first session and the second session. The CC sessions can be Connectivity Fault Management (CFM) sessions. The CC sessions can be Pseudowire Virtual Circuit Connectivity Verification (VCCV) sessions.

In yet another exemplary embodiment, a network with Continuity Check (CC) protocol optimization includes a plurality of interconnected switches; wherein a first switch and a second switch of the a plurality of interconnected switches are configured to operate a plurality of CC sessions with one another, wherein, for CC intervals, N sessions of the plurality CC sessions are set to a short interval and M session of the plurality of CC sessions are set to a long interval, switch a first session of the N sessions with a second session of the M sessions based on one of a fault and user provisioning, and exchange the CC intervals between the first session and the second session subsequent to the switching. The CC sessions can be Bidirectional Forwarding Detection (BFD) sessions. The CC sessions can be one of Pseudowire Virtual Circuit Connectivity Verification (VCCV) sessions and Connectivity Fault Management (CFM) sessions.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 2 is a block diagram of a BFD control packet;

DETAILED DESCRIPTION OF THE DISCLOSURE

In various exemplary embodiments, Continuity Check (CC) protocol optimization systems and methods are described for sessions in Multiprotocol Label Switching (MPLS), Carrier Ethernet, Pseudowires, and the like. Variously, for a primary connection and a backup connection, two CC sessions are utilized—one as a short interval CC session and the other as a long interval CC session. Specifically, the primary or active connection is the high frequency CC session while the backup or standby connection is the long interval CC session. The systems and methods utilize an auto-exchange between the short interval CC session and the long interval CC session based on which connection is active. In this manner, faults can be detected faster on the primary or active connection while supporting a lower number of short interval CC sessions. This efficiently utilizes the overall number of sessions supported in lower end Ethernet switches (e.g., CPE devices) to achieve quick protection switchover. The auto-exchange can be utilized between active and backup connections as well as across different connections, and the auto-exchange can be performed without bringing a session down.

Exemplary Network

Figure 1:
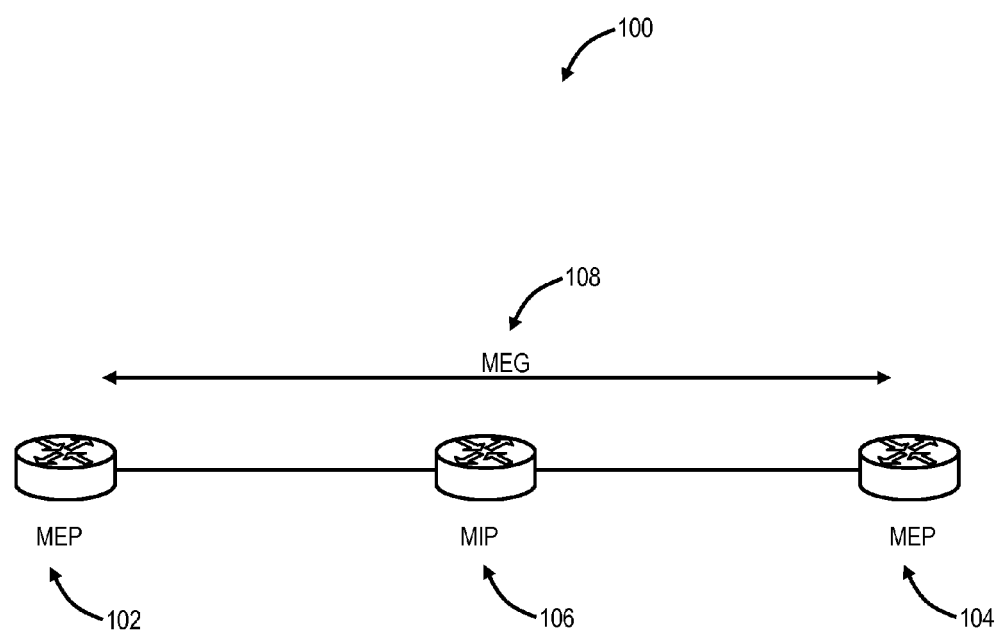
FIG. 1 is a network diagram illustrates an exemplary Ethernet network configured with Operations, Administration, and Maintenance (OAM) mechanisms.

Referring to FIG. 1, in an exemplary embodiment, a network diagram illustrates an exemplary Ethernet network 100 configured with Operations, Administration, and Maintenance (OAM) mechanisms. For illustration purposes, the Ethernet network 100 includes three interconnected network elements 102, 104, 106. The Ethernet network 100 includes connectivity checks in the OAM mechanisms. In an exemplary embodiment, the connectivity checks can include BFD packets, such as defined in IETF RFC 5880, IETF RFC 5881, IETF RFC 5884, and IETF RFC 5885. In another exemplary embodiment, the connectivity checks can include CCMs such as defined in IEEE 802.1ag (2007) or ITU-T Recommendation G.8031/Y.1731. The OAM mechanisms as described herein can include BFD, IEEE 802.1ag, or G.8031/Y.1731. For example, BFD packets can be used in when the Ethernet network 100 is MPLS-based and CCMs can be used when the Ethernet network 100 is pure Layer-2. The systems and methods described herein contemplate operation with BFD packets, CCMs, or any other type of connectivity check techniques or the like periodically operating in the network 100.

Fundamental to the OAM mechanisms is the concept of a Maintenance Entity (ME) or a Maintenance Association (MA), which is the identified network transport construct spanning the various network nodes underlying a given service or set of services. The OAM mechanisms relies on well-defined messages exchanged between the network elements, specifically and in particular each Maintenance End Point (MEP) that provides origination and termination of the service transport path(s) for a ME or MA. In the example of FIG. 1, the network elements 102, 104 are defined as a MEG End Point (MEP). In the OAM mechanisms, a MEP is configured to source and sink CCMs, etc., i.e. source and sink within a single configured MD (Maintenance Domain), pass-thru if MD Level is higher than the configured level for the MEP, and discard if MD Level is lower. The MEPs 102, 104 are also configured to participate in performance monitoring and live connectivity checks. In a point-to-point network such as illustrated in FIG. 1, there are two MEP nodes at the endpoints, and in other configurations as are also contemplated by the CC protocol optimization systems and methods, there may be multiple MEP nodes. Also, a domain having one or more Maintenance Intermediate Point (MIP) nodes that may be bounded by a plurality of MEP nodes. In order that CCMs, etc. flows are appropriately filtered so that they are processed only by the intended domain's nodes, the MEP/MIP population of the Ethernet network 100 is configured appropriately.

The network element 106 is defined as a MIP which resides between MEPs, i.e. the MIP 106 is communicatively coupled between the MEPs 102, 104. A MIP is configured to process and forward CCMs, etc., but does not initiate CCMs, etc. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the CC protocol optimization systems and methods described herein. The various terminology utilized herein, such as MEP, MIP, etc. is common to each of IEEE 802.1ag-2007, G.8013/Y.1731, etc. IEEE 802.1ag-2007 utilizes the term Maintenance Association (MA) whereas G.8013/Y.1731 utilize Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering the constructs of IEEE 802.1ag-2007, G.8013/Y.1731, MEF, etc.

In one aspect of the OAM mechanisms, BFD packets and CCMs provide mechanisms for connectivity verification. Collectively, the BFD packets and CCMs can be referred to as connectivity check (CC) frames. The CC frames are generally used to verify connectivity of a path, e.g. between the MEPs 102, 104. BFD is used to detect faults between two forwarding engines connected by a link, i.e. between Label Switch Routers (LSRs) and Label Edge Routers (LERs). It provides low-overhead detection of faults even on physical media that do not support failure detection of any kind, such as Ethernet, virtual circuits, tunnels, Pseudowires, and MPLS Label Switched Paths. BFD does not have a discovery mechanism; sessions must be explicitly configured between the endpoints. BFD may be used on many different underlying transport mechanisms and layers, and operates independently of all of these. Therefore, it needs to be encapsulated by whatever transport it uses. For example, monitoring MPLS Label Switched Paths (LSPs) involves piggybacking session establishment on LSP-Ping packets. Protocols that support some form of adjacency setup, such as OSPF or IS-IS, may also be used to bootstrap a BFD session. These protocols may then use BFD to receive faster notification of failing links than would normally be possible using the protocol's own keep alive mechanism. A session may operate in one of two modes: asynchronous mode and demand mode. In asynchronous mode, both endpoints periodically send Hello packets to each other. If a number of those packets are not received, the session is considered down. In demand mode, no Hello packets are exchanged after the session is established; it is assumed that the endpoints have another way to verify connectivity to each other, perhaps on the underlying physical layer. However, either host may still send Hello packets if needed. Regardless of which mode is in use, either endpoint may also initiate an Echo function. When this function is active, a stream of Echo packets is sent, and the other endpoint, then sends these back to the sender via its forwarding plane. This is used to test the forwarding path on the remote system.

BFD Packets

Referring to FIG. 2, in an exemplary embodiment, a block diagram illustrates a BFD control packet 150. Again, BFD establishes a session between two network devices to detect failures on the bidirectional forwarding paths between the devices and provide services for upper layer protocols. BFD provides no neighbor discovery mechanism. Protocols that BFD services notify BFD of devices to which it needs to establish sessions. After a session is established, if no BFD control packet is received from the peer within the negotiated BFD interval, BFD notifies a failure to the protocol, which then takes appropriate measures. The following table describes the various fields in the BFD control packet 150:

| | |
|---|---|
| Vers | version number of the BFD protocol, currently 1 |
| Diag | diagnosis word, indicating the reason for the last session status change of the local BFD system |
| Sta | local status of the BFD session |
| P | a flag, when parameters are changed, the sender set this flag in the BFD packet, and the receiver must respond to this packet at once |
| F | a flag, this flag must be set in the packet responding to flag P |
| C | a forwarding/control separation flag, once this flag is set, control plane variation does not affect the BFD detection. For example, if the control plane is ISIS, when the ISIS resets/GR, the BFD can continually monitor the link status |
| A | an authentication flag, if this flag is set, it indicates that the session needs to be authenticated |
| D | If this flag is set, the BFD session wants to use Demand Mode. |
| R | preserved bit (Reserved) |
| Detect Mult | a detection timeout multiple, it is used in calculating detection timeout time by the detector |
| Length | a packet length |
| My Discriminator | an identifier for the BFD session connecting to the local side |
| Your Discriminator | an identifier for the BFD session connecting to the remote side |
| Desired Min Tx Interval | the minimum sending interval of the BFD packet supported by the local side |
| Required Min Rx Interval | the minimum receiving interval of the BFD packet supported by the local side |
| Required Min Echo RX Interval | the minimum receiving interval of the Echo packet supported by the local side (it is set to 0 if the local side does not support the Echo function) |
| Auth Type | an authentication type, the current protocol provides: Simple Password, Keyed MD5, Meticulous Keyed MD5, Keyed SHA1, and Meticulous Keyed SHA1 |
| Auth Length | an authentication data length |
| Authentication Date | an authentication data area |

CFM—Continuity Check Messages (CCM)

CFM includes Continuity Check Messages (CCM) which may generally be referred to as "heart beat" messages for CFM. That is, CCMs provide a mechanism to detect connectivity failures in a Maintenance Entity Group (MEG) or a Maintenance Association (MA). CCMs are multicast messages that are confined to a MEG Level or a Maintenance Domain (MD). These messages are unidirectional and do not solicit a response. Each Maintenance End Point (MEP) transmits a periodic multicast CCM inward towards the other MEPs. Conventionally, CCM related attributes are statically configured in IEEE 802.1ag-2007, G.8013/Y.1731, and the MEF. In order to change the attributes, static reconfiguration is required. Also, MEPs are statically configured in IEEE 802.1ag-2007, G.8013/Y.1731, MEF 17, etc. In order to add or remove a MEP from a MEG or a MA, static reconfiguration is also needed.

Figure 3:
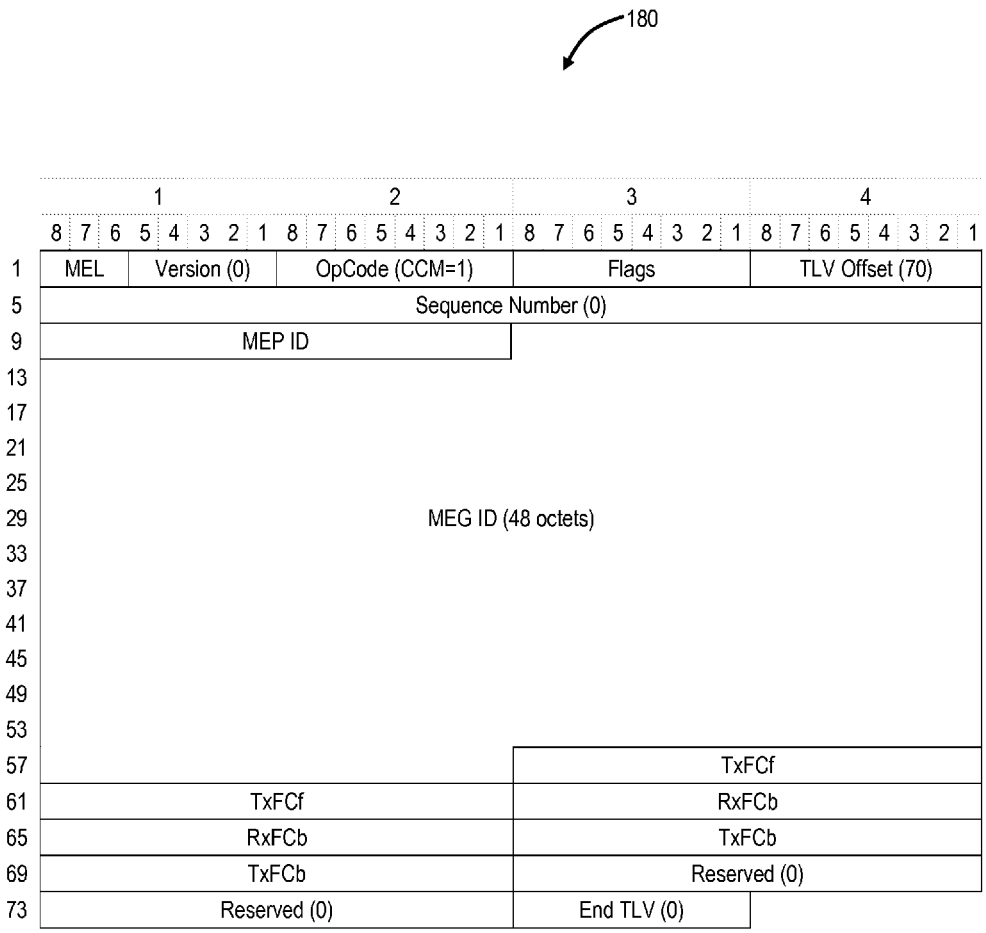
FIG. 3 is a block diagram of an exemplary CCM protocol data unit (PDU)

Referring to FIG. 3, in an exemplary embodiment, a block diagram illustrates an exemplary CCM protocol data unit (PDU) 180. As described herein, the CCM PDU 180 is multicast from MEPs to all MIPs and MEPs associated with a given MA/MEG. In an exemplary embodiment, the CCM PDU 180 is a G.8013/Y.1731 Ethernet Continuity Check (ETH-CC) PDU. Generally, CCMs refer to the overall PDU whereas the ETH-CC represents the information contained therein. The ETH-CC function is used for proactive OAM such as to detect loss of continuity (LOC) between any pair of MEPs in a MEG, unintended connectivity between two MEGs (Mismerge), unintended connectivity within the MEG with an unexpected MEP (Unexpected MEP), and other defect conditions (e.g. Unexpected MEG Level, Unexpected Period, etc.). Thus, the CCM is applicable for fault management, performance monitoring, or protection switching applications. In operation, upon reception, a MEP reports a frame with unexpected ETH-CC information. As described herein, CCM transmission may be enabled or disabled in a MEG/MA. When CCM transmission is enabled in a MEG/MA, all MEPs are enabled to periodically transmit frames with ETH-CC information to all other MEPs in the MEG/MA. The CCM transmission period may be the same for all MEPs in the MEG/MA. When a MEP is enabled to generate frames with ETH-CC information, it also expects to receive frames with ETH-CC information from its peer MEPs in the MEG/MA.

The CCM PDU 180 may include a MEG Level (MEL) which is a 3-bit field containing an integer value (0 to 7) that identifies the MEG Level of the CCM PDU 180. A Version field is a 5-bit field containing an integer value that identifies the OAM protocol version. An OpCode is a 1-octet field containing an OpCode that identifies an OAM PDU type, and in the case of the CCM PDU 180 is set to 1. The OpCode is used to identify the remaining content of an OAM PDU. A Flag field is an 8-bit field dependent on the OAM PDU type, and in the case of the CCM PDU 180 contains two information elements for Remote Defect Indication (RDI) and Period. A first bit of the Flag field (bit 8) is a single bit for RDI, which is set to 1 to indicate a remote defect, and otherwise is set to 0. The last three bits of the Flag field (bits 3 to 1) indicate a transmission period for the CCM PDU 180 as illustrated in the following table:

| Flags [3:1] | Period Value | Comments |
| --- | --- | --- |
| 000 | Invalid Value | Invalid value for CCM PDUs |
| 001 | 3.33 ms | 300 frames per second |
| 010 | 10 ms | 100 frames per second |
| 011 | 100 ms | 10 frames per second |
| 100 | 1 s | 1 frame per second |
| 101 | 10 s | 6 frames per minute |
| 110 | 1 min | 1 frame per minute |
| 111 | 10 min | 6 frame per hour |

CC Protocol Optimization Process

Figure 4:
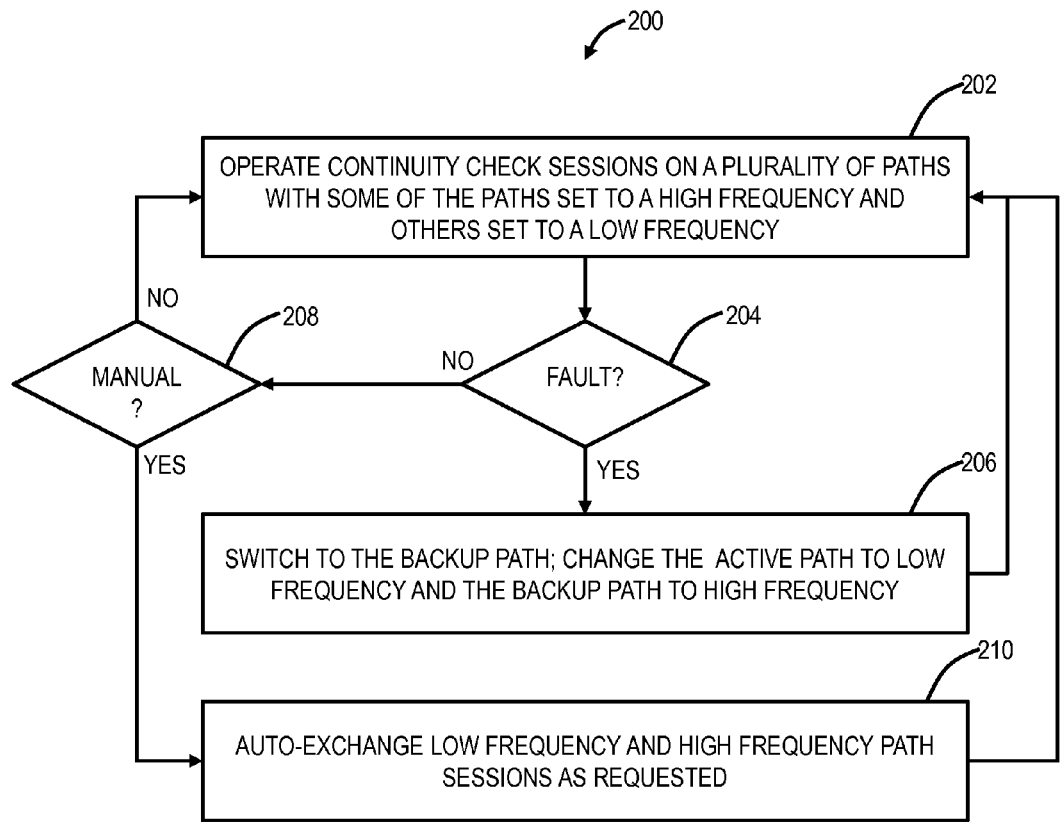
FIG. 4 is a flowchart of a CC protocol optimization process.

Referring to FIG. 4, in an exemplary embodiment, a flow chart illustrates a CC protocol optimization process 200. The protocol optimization process 200 contemplates operation in an Ethernet switch, and preferably in an Ethernet switch with support of a low number of short interval CC sessions, such as in a CPE device or the like. The protocol optimization process 200 includes segmenting CC sessions based on transmission interval, such as short interval (e.g., 10 ms or less) and long interval (e.g., is or more). For an active path, it is important to utilize the short interval, but not on a backup path, which can utilize the long interval. It addition, the protocol optimization process 200 includes an auto-exchange process where paths can switch between CC intervals between the short interval and the long interval and vice versa.

The protocol optimization process 200 includes the Ethernet switch operating continuity check sessions on a plurality of paths with some of the paths set to a short interval and others set to a long interval (step 202). In an exemplary embodiment, there can be two operating contexts of the protocol optimization process 200, namely i) active and standby paths and ii) low and high priority paths. Note, these operating contexts can be separate or together. In the active and standby path context, the active path is set to the short interval and the backup path is set to the long interval. If there is a fault on the active path (step 204), the Ethernet switch switches to the backup path, and the active path is changed to long interval and the backup path (which is now the active path) is set to short interval (step 206). This switch is the so-called auto-exchange. In this manner, only the active path is set to the short interval for fast switching while the backup path is set to long interval. The protocol optimization process 200 can also include manual adjustment of the plurality of paths (step 208). Here, a user can manually exchange or the system auto-exchange paths between long interval and short interval (step 210). That is, the user can manually perform the exchange or the system auto-exchange based on a switch.

In an exemplary embodiment, the protocol optimization process 200 operates with MPLS over LSPs. In the case of 1:1 LSP protection, normally two 10 ms BFD sessions are used to achieve the 50 ms switchover time for both cases (primary to backup and backup to primary). In an exemplary embodiment, with the protocol optimization process 200, only one 10 ms BFD session (short interval) and one 1 second BFD session (long interval) are used. When the primary tunnel faults, then the Ethernet switch moves the backup and also swaps the 1 second interval with the 10 ms interval so when the backup tunnel faults, 50 ms switchover can be guaranteed.

In another exemplary embodiment, the protocol optimization process 200 can be operated over tunnel groups. Here, a user can configure one short interval over one LSP per tunnel group. The user can also select auto-exchange to use that short interval BFD session over any active LSP inside that tunnel group to achieve the minimum switchover loss. The other LSPs inside the tunnel group can be set to the long interval. The auto-exchange not only works within the LSP group; it can be extended between the LSP groups if the user wants to have one short interval session for multiple LSP groups where the rest of the BFD sessions are long interval. The auto-exchange is done without bringing the session down.

In yet another exemplary embodiment, the protocol optimization process 200 can be operated over CCM sessions between MEPs, in Pseudowires, and the like.

The protocol optimization process 200 contemplate operation in a switch which can support up to N short interval CC sessions. For example, the switch can be a CPE switch where N=16. The switch can also be configured with M long interval CC sessions with N≤M, N and M are both integers. That is, there can be more long interval CC sessions than short interval CC sessions because the auto-exchange ensures that the short interval CC sessions are used where required.

Example MPLS Network

Figure 5:
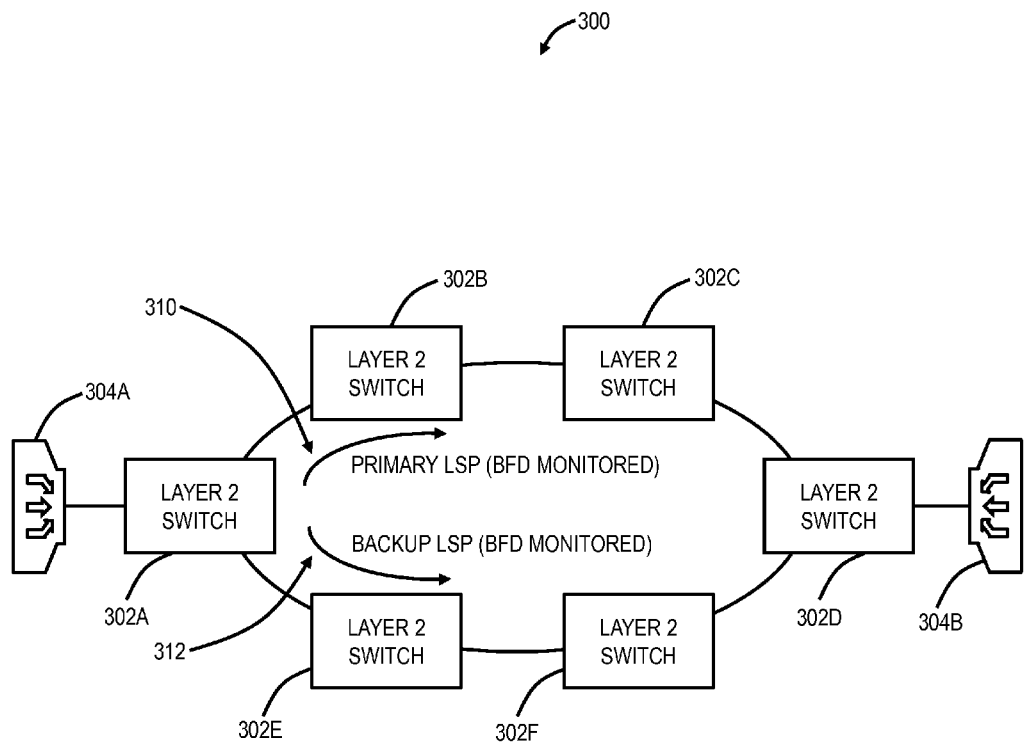
FIGS. 5 and 6 are network diagrams of an MPLS network for illustration of the protocol optimization process of FIG. 4.
Figure 6:
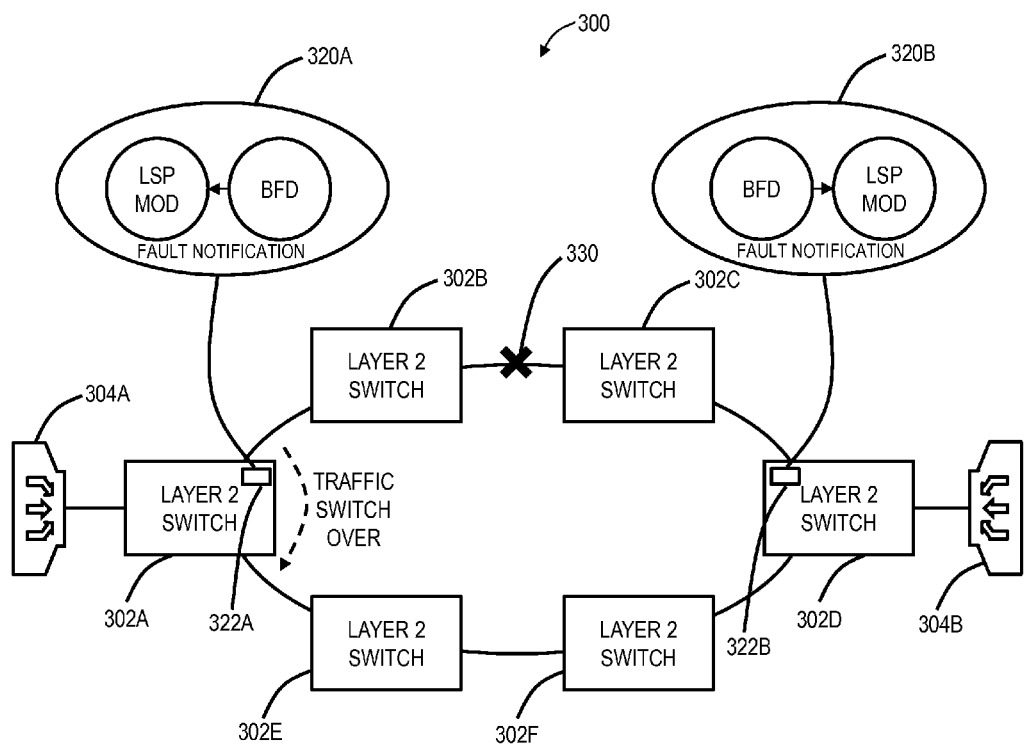

Referring to FIGS. 5 and 6, in an exemplary embodiment, a network diagram illustrates an MPLS network 300 for illustration of the protocol optimization process 200. The MPLS network 300 includes various L2 switches 302A-302F and two customer switches 304A, 304B connected through the L2 switches 302A-302F. There is a primary LSP 310 between the switch 302A and the switch 302D through the switches 302B, 302C, and a backup LSP 312 between the switch 302A and the switch 302D through the switches 302E, 302F. With the protocol optimization process 200, the primary LSP 310 is set to a short interval session, e.g. BFD negotiated interval of 10 ms, and the backup LSP 312 is set to a long interval, e.g. BFD negotiated interval of 1 s. In the example of FIGS. 5 and 6, the switches 302A, 302D are LER switches, and the switches 302B, 302C, 302E, 302F are LSP switches. The LSP switches are intermediate switches configured to switch labels used to route packets. The LER switches are ingress/egress switches that push a label on a packet (ingress) or pop a label off a packet (egress).

Each of the switches 302A, 302D include a fault notification engine 320A, 320B operating in circuitry 322A, 322B. The fault notification engine 320A, 320B processes BFD packets from a peer switch, e.g. the fault notification engine 320A processes BFD packets from the switch 302D and the fault notification engine 320B processes BFD packets from the switch 302A. Upon detection of a fault 330, the fault notification engine 320A, 320B informs a LSP module which causes a traffic switch over, to the backup path.

Again, to achieve a 50 ms failover, BFD sessions should have at least a 10 ms interval or below. The protocol optimization process 200 maintains this failover, and avoids having every session operating at the short interval. In the MPLS network 300 with the protocol optimization process 200, one 10 ms short interval BFD session (over the primary tunnel) and one low long interval (1 second interval) over the other LSP are configured in the same LSP group (tunnel group) and the auto exchange feature is selected in those BFD sessions. When the fault 330 occurs in the primary tunnel, BFD detects the fault 330 and LSP group switchover makes the backup tunnel active. BFD receives the information about the newly active tunnel, if the newly active tunnel (backup tunnel) is running with 1 second interval. BFD swaps the short interval (10 ms) and long interval (1 second) between the backup and primary tunnel, in this way when the backup tunnel goes down even that fault will be detected within 50 ms. This allows only one 10 ms or 3.3 ms per LSP group (not per LSP). Note, for the auto-exchange in BFD, IETF RFC 5880 mechanisms are used to re-negotiate the CC interval from is to 10 ms or 3.3 ms. Advantageously, this is standards compliant and maintains interoperability with other switches not operating the protocol optimization process 200.

Switchover Logic

Figure 7:
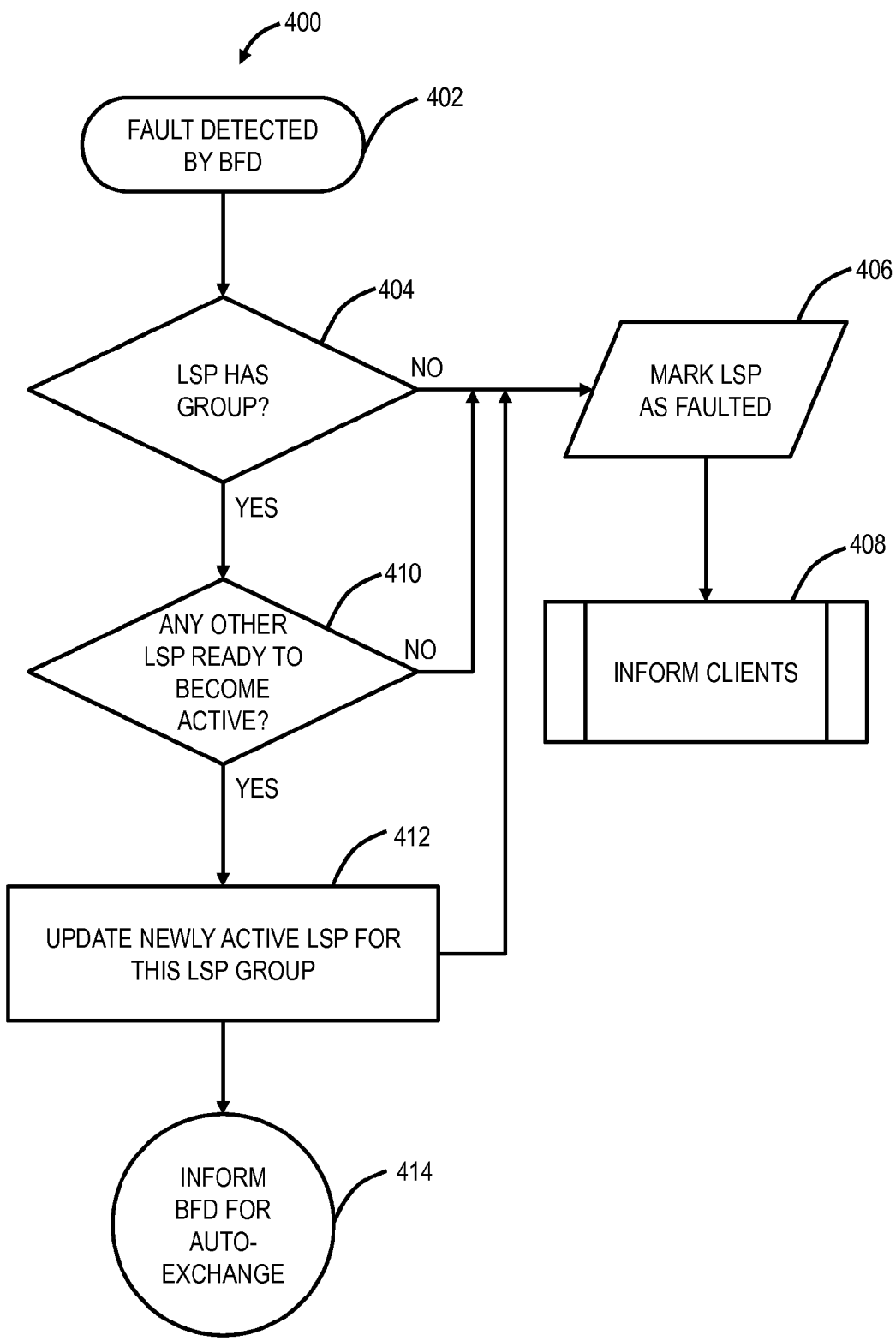
FIG. 7 is a flowchart of switchover logic for the protocol optimization process of FIG. 4.

Referring to FIG. 7, in an exemplary embodiment, a flow chart illustrates switchover logic 400. The switchover logic 400 can be implemented in the switches 302A, 302D through the fault notification engine 320A, 320B and in response to receiving a fault (step 402). If the LSP does not have a group (step 404), the switchover logic 400 includes marking the LSP as faulted (step 406) and informing clients (step 408). If the LSP has a group (step 404), the switchover logic 400 includes checking if any other LSPs are ready to become active, and if not (step 410), the switchover logic 400 goes to the step 406. If there is another LSP ready to become active (step 410), the switchover logic 400 updates the newly active LSP for this LSP group (step 412), informs BFD for auto-exchange (step 414), and the switchover logic 400 goes to the step 406.

Auto-Exchange Logic

Figure 8:
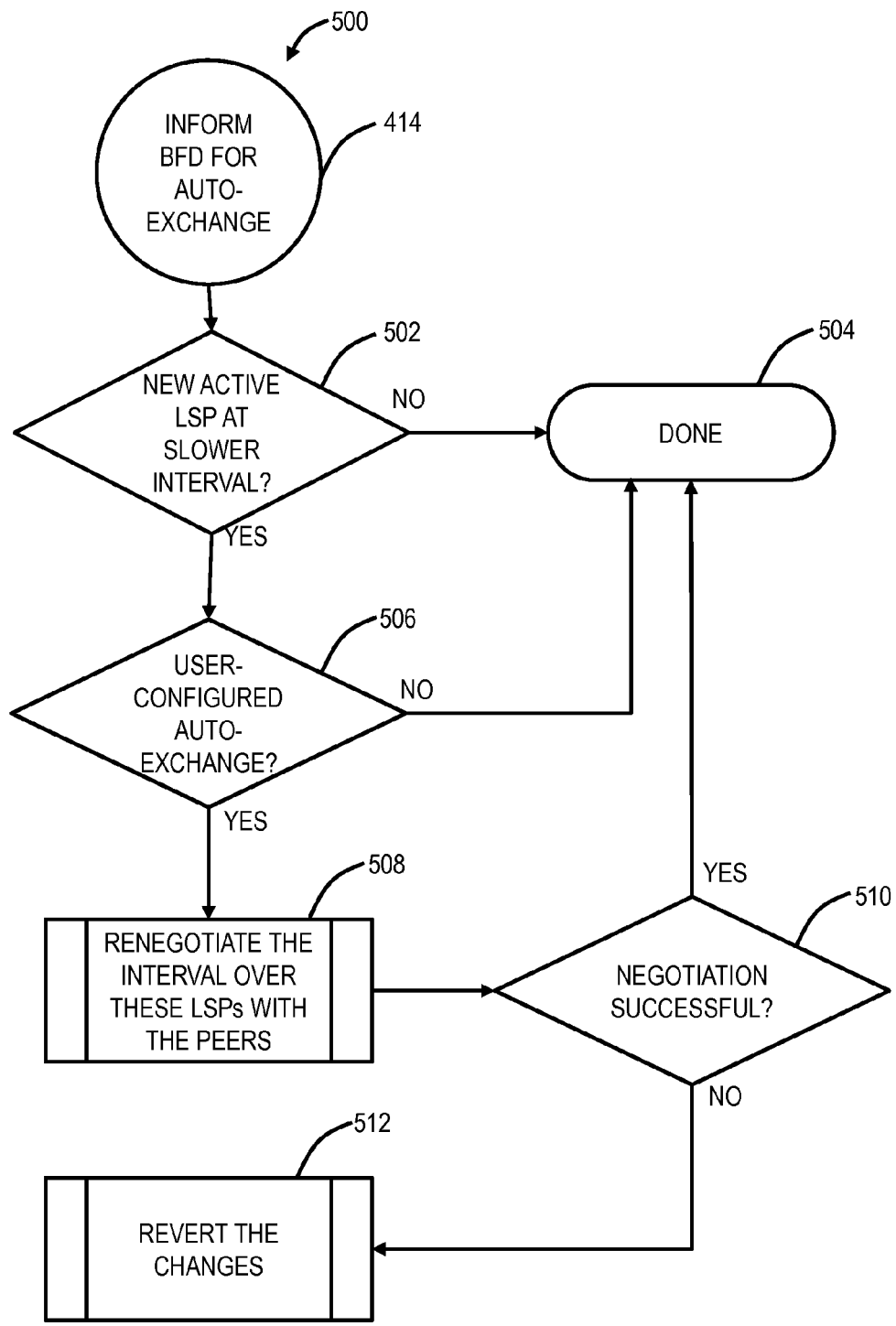
FIG. 8 is a flowchart of auto-exchange logic of the protocol optimization process of FIG. 4.

Referring to FIG. 8, in an exemplary embodiment, a flow chart illustrates auto-exchange logic 500. The auto-exchange logic 500 can be implemented in the switches 302A, 302D through the fault notification engine 320A, 320B and with the switchover logic 400. The auto-exchange logic 500 begins at the step 414 and includes checking if the old active LSP is at a higher interval (step 502). That is, is the failed LSP at a shorter CC interval than the new active LSP, and if not, the auto-exchange logic 500 ends (step 504), i.e. no auto-exchange is required. If the failed LSP is at a higher interval than the new active LSP (step 502), the auto-exchange logic 500 checks if these LSPs are user-configured for auto-exchange (step 506), and if not, the auto-exchange logic 500 ends (step 504).

If these LSPs are user-configured for auto-exchange (step 506), the auto-exchange logic 500 renegotiates the interval over these LSPs with the peers (step 508). This renegotiation is done through the IETF RFC 5880 mechanisms. The auto-exchange logic 500 includes checking if the negotiation is successful (step 510), and if so, the auto-exchange logic 500 ends (step 504), and if not, the auto-exchange logic 500 includes reverting the changes (step 512).

Before a BFD session is established, BFD control packets are sent every one second to reduce traffic. After a session is established, BFD control packets are sent at the negotiated interval for fast detection, and the BFD control packet transmit interval and detection timer are negotiated. If a BFD session is valid, these timers can be negotiated and modified without affecting session state. The timers for different BFD session directions are negotiated independently of each other and therefore can be different. The BFD control packet transmit interval is the greater of the Desired Min TX Interval of the local end and the Required Min RX Interval of the peer.

If the Desired Min TX Interval of the local end increases, the actual BFD control packet transmit interval of the local end cannot be changed until the local end receives a packet with the F bit set from the peer. This ensures that the peer has increased the detection timer before the BFD control packet transmit interval increases on the local end, thus avoiding detection timer timeout errors on the peer. If the Required Min RX Interval of the local end decreases, the detection timer of the local end cannot be changed until the local end receives a packet with the F bit set from the peer. This ensures that the peer has decreased the BFD control packet transmit interval before the local end decreases the detection timer, thus avoiding detection timer timeout errors on the local end. If the Desired Min TX Interval decreases, so does the BFD control packet transmit interval on the local end immediately. If the Required Min RX Interval increases, so does the detection timer at the local end immediately.

For example, a BFD session is established between the switches 302A, 302D. Both the switches 302A, 302D has the same Desired Min TX Interval (hereinafter referred to as TX) and Required Min RX Interval (hereinafter referred to as RX) of 100 milliseconds and the same Detect Multitude (Multiplier) of 3. According to timer negotiation rules, the BFD control packet transmit interval is the switch 302A's TX or the switch 302D's RX, whichever is greater, namely, 100 milliseconds, 302D's transmit interval is also 100 milliseconds, and both the switches 302A, 302D has a detection timer of 300 milliseconds. If TX and RX of the switch 302A are increased to 150 milliseconds: 1) the switch 302A compares its RX (150 milliseconds) with the switch 302D's TX (100 milliseconds) and thus changes the detection timer of the local end to 450 milliseconds. Meanwhile, the switch 302A sends a BFD control packet (with a TX and RX of 150 milliseconds) whose P bit is set to the peer. 2) Upon receipt of the packet, the switch 302D replies to the switch 302A with a BFD control packet whose F bit is set (with a TX and RX of 100 milliseconds). Meanwhile, the switch 302D compares the RX in the received packet with the TX of the local end. As TX is greater, the switch 302D's transmit interval is changed to 150 milliseconds. After comparing the RX of the local end with the TX of the peer, the switch 302D has also changed its detection timer to 450 milliseconds. 3) the switch 302A receives a BFD control packet with the F bit set from the peer. After comparing the RX in the received packet and the TX of the local end, the switch 302A calculates the new transmit interval as 150 milliseconds. 4) The timer negotiation is complete. The BFD control packet transmit interval and detection timer for the switches 302A, 302D are 150 milliseconds and 450 milliseconds respectively.

Auto-exchange can also be implemented with other CC protocols such as CCMs. Here, for example, the CCMs can include proprietary Type-Length-Value (TLV) fields which are used to renegotiate the intervals between peers since CCMs do not currently have a standards-based auto renegotiation mechanism.

Pseudowires

Figure 9:
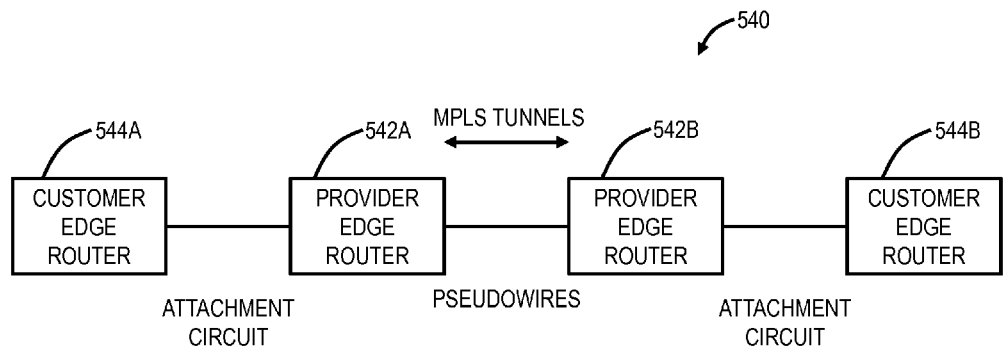
FIG. 9 is a network diagram of an MPLS network of Pseudowires over MPLS tunnels between provider edge routers and customer edge routers.

Referring to FIG. 9, in an exemplary embodiment, a network diagram illustrates an MPLS network 540 of Pseudowires over MPLS tunnels between provider edge routers 542A, 542B and customer edge routers 544A, 544B. Pseudowires provide a way to emulate point-to-point Ethernet services between the two customer edge routers 544A, 544B. The Pseudowires can be used to carry Ethernet PDU's over the MPLS network 540. Pseudowires are usually bidirectional paths and they allow traffic to be carried through a Packet-Switched Network such as MPLS using MPLS tunnels. For example, Pseudowires are described in IETF RFC 4447, "Pseudowire Setup and Maintenance Using the Label Distribution Protocol (LDP)," L. Martini, et al. (April 2006); and IETF RFC 4448, "Encapsulation Methods for Transport of Ethernet over MPLS Networks," L. Martini, et al. (April 2006), the contents of which are incorporated by reference herein.

Figure 10:
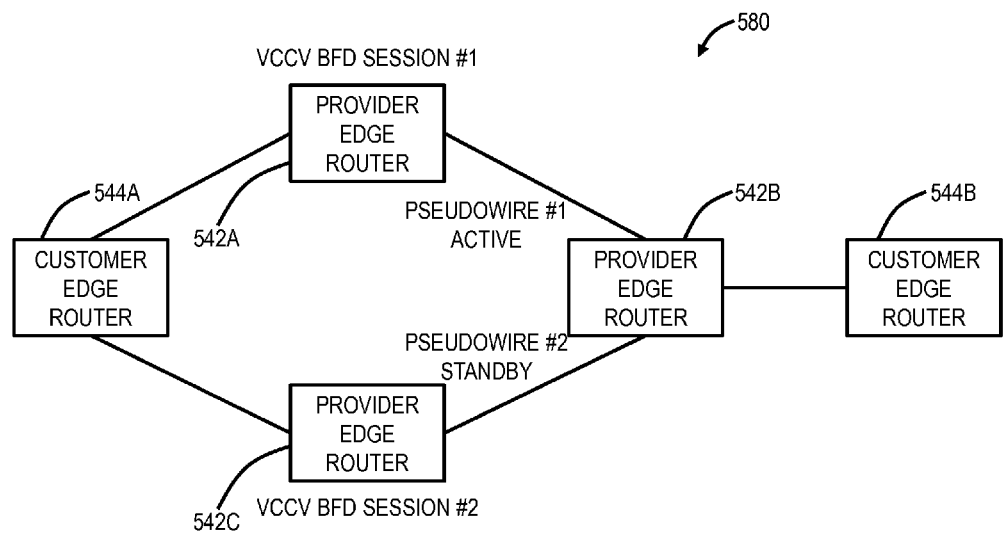
FIG. 10 is a network diagram of a network illustrating Pseudowire redundancy.

Referring to FIG. 10, in an exemplary embodiment, a network diagram illustrates a network 580 illustrating Pseudowire redundancy. The network 580 includes the customer edge routers 544A, 544B and the provider edge routers 542A, 542B, 542C. Pseudowire redundancy is provided between the customer edge routers 544A, 544B with a first Pseudowire (active) through the provider edge router 542A and a second Pseudowire (standby) through the provider edge router 542B. For example, Pseudowire redundancy is described in IETF RFC 6718, "Pseudowire Redundancy," P. Muley et al. (August 2012), the contents of which are incorporated by reference herein.

The active and standby Pseudowires include Virtual Circuit Connection Verification (VCCV) sessions with can be BFD or CCM. For example, VCCV BFD sessions are run between two end points of a Pseudowire and are used to detect datapath faults on the Pseudowires. The VCCV BFD sessions can be configured on each Label Edge Router (LER)/endpoint of the Pseudowire. The BFD CC (Continuity-check) packets are then sent across at negotiated transmit intervals and detect datapath faults over them using a detect timeout mechanism. Once a fault has been detected by VCCV BFD, the corresponding client, i.e., the Pseudowire manager/handler is notified and they can switch over to the backup Pseudowire so that customer traffic is not interrupted, see IETF RFC 5885.

Since VCCV BFD sessions (or CCM session) are simply a type of BFD session (or CCM session) which are used to monitor datapath faults over a Pseudowire (while LSP BFD sessions monitor data path faults over an LSP), the systems and methods described herein can be extended in the same manner. Again, since scalability for short interval BFD sessions are limited (by hardware resources etc.), the systems and methods can utilize the available scale numbers in an efficient manner. If a short interval VCCV BFD session is utilized to detect datapath faults and a long interval VCCV BFD session is used to detect datapath faults over a backup Pseudowire, once a fault is detected and switchover happens, the timers can be switched, and the quicker BFD session can be used Pseudowire the newly active Pseudowire. This ensures the quickest failover for customer traffic in case of datapath faults.

Exemplary Switch

Figure 11:
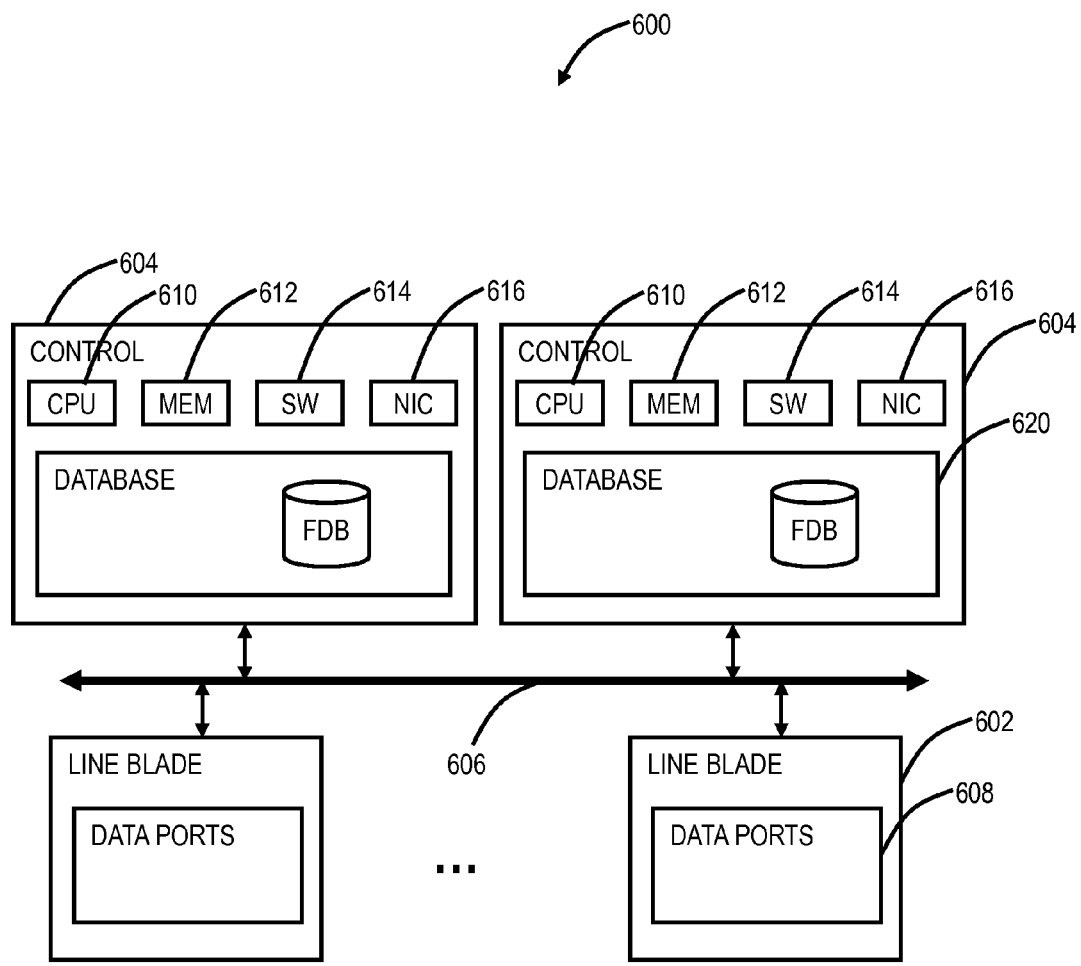
FIG. 11 is a block diagram of an exemplary implementation of a switch.

Referring to FIG. 11, in an exemplary embodiment, a block diagram illustrates an exemplary implementation of a switch 600. In this exemplary embodiment, the switch 600 is an Ethernet network switch, but those of ordinary skill in the art will recognize the systems and methods described herein contemplate other types of network elements and other implementations. The switch 600 can be an exemplary implementation of the MEPs 102, 104, MIP 106, and the switches 302; although other embodiments are also contemplated. In the exemplary embodiment of FIG. 11, the switch 600 includes a plurality of blades 602, 604 interconnected via an interface 606. The blades 602, 604 are also known as line cards, line modules, circuit packs, pluggable modules, etc. and refer generally to components mounted within a chassis, shelf, etc. of a data switching device, i.e., the switch 600. Each of the blades 602, 604 can include numerous electronic devices and optical devices mounted on a circuit board along with various interconnects including interfaces to the chassis, shelf, etc.

Two exemplary blades are illustrated with line blades 602 and control blades 604. The line blades 602 generally include data ports 608 such as a plurality of Ethernet ports. For example, the line blade 602 can include a plurality of physical ports disposed on an exterior of the blade 602 for receiving ingress/egress connections. Additionally, the line blades 602 can include switching components to form a switching fabric via the backplane 606 between all of the data ports 608 allowing data traffic to be switched between the data ports 608 on the various line blades 602. The switching fabric is a combination of hardware, software, firmware, etc. that moves data coming into the switch 600 out by the correct port 608 to the next switch 600. "Switching fabric" includes switching units, or individual boxes, in a node; integrated circuits contained in the switching units; and programming that allows switching paths to be controlled. Note, the switching fabric can be distributed on the blades 602, 604, in a separate blade (not shown), or a combination thereof. The line blades 602 can include an Ethernet manager (i.e., a CPU) and a network processor (NP)/application specific integrated circuit (ASIC). As described herein, the line blades 602 can participate in the systems and methods described herein.

The control blades 604 includes a microprocessor 610, memory 612, software 614, and a network interface 616. Specifically, the microprocessor 610, the memory 612, and the software 614 can collectively control, configure, provision, monitor, etc. the switch 600. The network interface 616 may be utilized to communicate with an element manager, a network management system, etc. Additionally, the control blades 604 can include a database 620 that tracks and maintains provisioning, configuration, operational data and the like. The database 620 can include a forwarding database (FDB). In this exemplary embodiment, the switch 600 includes two control blades 604 which may operate in a redundant or protected configuration such as 1:1, 1+1, etc. In general, the control blades 604 maintain dynamic system information, including Layer two forwarding databases, protocol state machines, and the operational status of the ports 608 within the switch 600.

Those of ordinary skill in the art will recognize the switch 600 can include other components which are omitted for illustration purposes, and that the systems and methods described herein are contemplated for use with a plurality of different devices with the switch 600 presented as an exemplary implementations. For example, in another exemplary embodiment, a network element may have switch modules, or have the corresponding functionality in the line blades 602 (or some equivalent) in a distributed fashion. For the switch 600, other architectures providing ingress, egress, and switching there between are also contemplated for the systems and methods described herein. In general, the systems and methods described herein contemplate use with any node providing switching or forwarding of packets using the protocol optimization systems and methods as described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. Each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Continuity Check (CC) protocol optimization method in a switch, the method comprising:
   operating a plurality of CC sessions with a peer switch, wherein, for CC intervals, N sessions of the plurality CC sessions are set to use a short interval and M sessions of the plurality of CC sessions are set to use a long interval, wherein N and M are integers, wherein the short interval is less than or equal to 10 ms and the long interval is 100 ms or greater;
   switching a first session of the N sessions with a second session of the M sessions based on one of a fault and user provisioning; and
   changing the CC intervals of the first session to the long interval and the second session to the short interval subsequent to the switching.

2. The CC protocol optimization method of claim 1, wherein the CC sessions are Bidirectional Forwarding Detection (BFD) sessions.

3. The CC protocol optimization method of claim 1, wherein the CC sessions are Bidirectional Forwarding Detection (BFD) sessions, and wherein the first session and the second session are 1:1 protected Label Switched Paths (LSPs) with the first session and the second session being, prior to the switching, an active path and a backup path respectively.

4. The CC protocol optimization method of claim 1, wherein the CC sessions are Bidirectional Forwarding Detection (BFD) sessions, wherein the N sessions and the M sessions are in a Label Switched Path (LSP) tunnel group with N<M.

5. The CC protocol optimization method of claim 1, wherein the CC sessions are Bidirectional Forwarding Detection (BFD) sessions, and wherein the exchanging is performed by changing interval times in BFD control packets.

6. The CC protocol optimization method of claim 1, wherein the exchanging is performed in-service on the first session and the second session.

7. The CC protocol optimization method of claim 1, wherein the CC sessions are Connectivity Fault Management (CFM) sessions.

8. The CC protocol optimization method of claim 1, wherein the CC sessions are Pseudowire Virtual Circuit Connectivity Verification (VCCV) sessions.

9. A switch with Continuity Check (CC) protocol optimization, the switch comprising:
   one or more ports; and
   a controller communicatively coupled to the one or more ports;
   wherein the one or more ports and the controller are configured to
      operate a plurality of CC sessions with a peer switch, wherein, for CC intervals, N sessions of the plurality CC sessions are set to use a short interval and M sessions of the plurality of CC sessions are set to use a long interval, wherein N and M are integers, wherein the short interval is less than or equal to 10 ms and the long interval is 100 ms or greater,
      switch a first session of the N sessions with a second session of the M sessions based on one of a fault and user provisioning, and change the CC intervals of the first session to the long interval and the second session to the short interval subsequent to the switching.

10. The switch of claim 9, wherein the CC sessions are Bidirectional Forwarding Detection (BFD) sessions, and wherein the first session and the second session are 1:1 protected Label Switched Paths (LSPs) with the first session being an active path and the second session being a backup path prior to the switching.

11. The switch of claim 9, wherein the CC sessions are Bidirectional Forwarding Detection (BFD) sessions, wherein the N sessions and the M sessions are in a Label Switched Path (LSP) tunnel group with N<M.

12. The switch of claim 9, wherein the CC sessions are Bidirectional Forwarding Detection (BFD) sessions, and wherein the exchanging is performed by the switch through changing interval times in BFD control packets.

13. The switch of claim 9, wherein the exchanging is performed in-service without affecting service on the first session and the second session.

14. The switch of claim 9, wherein the CC sessions are Connectivity Fault Management (CFM) sessions.

15. The switch of claim 9, wherein the CC sessions are Pseudowire Virtual Circuit Connectivity Verification (VCCV) sessions.

16. A network with Continuity Check (CC) protocol optimization, the network comprising:
a plurality of interconnected switches;
wherein a first switch and a second switch of the plurality of interconnected switches are configured to
operate a plurality of CC sessions with one another, wherein, for CC intervals, N sessions of the plurality CC sessions are set to use a short interval and M session of the plurality of CC sessions are set to use a long interval, wherein N and M are integers, wherein the short interval is less than or equal to 10 ms and the long interval is 100 ms or greater,
switch a first session of the N sessions with a second session of the M sessions based on one of a fault and user provisioning, and
change the CC intervals of the first session to the long interval and the second session to the short interval subsequent to the switching.

17. The network of claim 16, wherein the CC sessions are Bidirectional Forwarding Detection (BFD) sessions.

18. The network of claim 16, wherein the CC sessions are one of Pseudowire Virtual Circuit Connectivity Verification (VCCV) sessions and Connectivity Fault Management (CFM) sessions.

* * * * *